United States Patent [19]

Mizuno et al.

[11] Patent Number: 5,057,995

[45] Date of Patent: Oct. 15, 1991

[54] ROBOT CONTROL APPARATUS

[75] Inventors: Tohru Mizuno, Tama; Tetsuya Kosaka, Minamitsuru, both of Japan

[73] Assignee: Fanuc Ltd, Minamitsuru, Japan

[21] Appl. No.: 269,149

[22] PCT Filed: Apr. 15, 1988

[86] PCT No.: PCR/JP88/00374

§ 371 Date: Oct. 28, 1988

§ 102(e) Date: Oct. 28, 1988

[87] PCT Pub. No.: WO88/08158

PCT Pub. Date: Oct. 20, 1988

[30] Foreign Application Priority Data

Apr. 15, 1987 [JP] Japan .............................. 62-092866

[51] Int. Cl.⁵ ............................................. G06F 15/46
[52] U.S. Cl. .................................. 364/192; 364/191; 364/513; 901/3
[58] Field of Search .............. 364/513, 474.28, 474.30, 364/474.35, 474.36, 191–193, 474.22, 474.23, 474.24; 318/568; 901/2, 3, 4, 5

[56] References Cited

U.S. PATENT DOCUMENTS

| | | | |
|---|---|---|---|
| 4,348,623 | 9/1982 | Kobayashi et al. | 364/513 |
| 4,541,060 | 9/1985 | Kogawa | 364/513 |
| 4,543,639 | 9/1985 | Inaba et al. | 364/513 |
| 4,602,345 | 7/1986 | Yokoyama | 901/3 |
| 4,761,745 | 8/1988 | Kodaira | 318/568.13 |
| 4,890,234 | 12/1989 | Tanaka et al. | 364/474.23 |

Primary Examiner—Jerry Smith
Assistant Examiner—Paul Gordon
Attorney, Agent, or Firm—Staas & Halsey

[57] ABSTRACT

A robot control apparatus programmably controls a taught/playback-type robot. The control apparatus has processing control means (CPU) which converts a group of position data contained in a plurality of robot command data inputted from a teaching panel into set-type command data together with other robot command data, stores the converted command data in a data memory (RAM), and creates a robot motion program by editing the command data.

4 Claims, 3 Drawing Sheets

ROBOT CONTROL APPARATUS

BACKGROUND OF THE INVENTION

1. Field of the Invention

This invention relates to a robot control apparatus for programmably controlling a taught/playback-type robot.

2. Description of the Related Art

In order to programmably control a robot having a plurality of controlled axes along a predetermined motion path, it is usually required that the robot be taught designated points successively and that the points be stored in a data memory. In the teaching of such robot command data, addresses indicating which of the locations of the data memory the taught data are to be stored are set and displayed, and target positions at which motions are to be performed as well as motion velocities are designated while actually moving a robot hand by a teaching panel or the like. The taught position data are usually stored upon naming them, as shown at $P_1$, $P_2$, ... in FIG. 5(a) and $P_{k-1}$, $P_k$, ... in FIG. 5(b).

It has recently become possible to have robots execute complicated activities. For this reason, the above-mentioned conventional method of storing taught points involves a large number of taught target points and increased program length. When a motion program is to be modified, moreover, it is difficult to visualize the correspondence between the program and the motion paths, thus a particular inconvenience is that rewriting position data requires a great amount of time.

SUMMARY OF THE INVENTION

The present invention has been devised to solve these problems and its object is to provide a robot control apparatus in which motion commands and position data in a robot motion program can be easily visualized and which is readily manageable robot command data can be created.

In accordance with the present invention, there is provided a robot control apparatus including a teaching panel for teaching motion target positions and motion velocities, data converting means for converting a position data group contained in robot command data input from the teaching panel into set-type command data together with other robot command data, a data memory for storing the converted command data, and processing control means for creating robot motion data by editing the command data in the data memory.

Thus, the robot control apparatus of the present invention converts a group of position data contained in robot command data into set-type command data together with other robot command data and stores the converted command data. Therefore, by assigning suitable names to the converted command data, readily manageable robot command data can be created. Even if there are many taught points for robot motion, conversion is made into set-type data which simultaneously incorporates various information such as travelling velocity at these positions besides the position data, and these data are stored. This makes the robot command data easy to manage.

DESCRIPTION OF THE PREFERRED EMBODIMENT

An embodiment of the present invention will now be described in detail with reference to the drawings.

Figure 1:
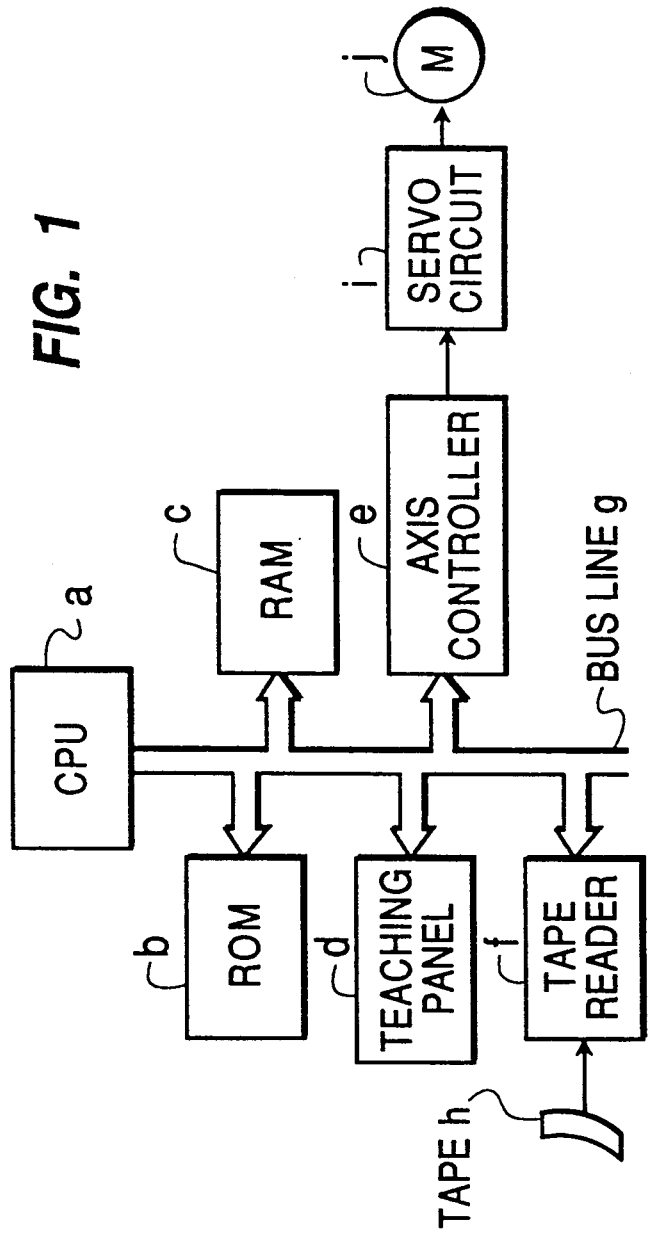
FIG. 1 is a block diagram illustrating the general construction of a robot control apparatus to which the present invention is applied.

FIG. 1 is a block diagram illustrating the general construction of a robot control apparatus in which the present invention is applied. In FIG. 1, a memory (ROM) b, a memory (RAM) c, a teaching panel d, an axis controller e and a tape reader f are connected to a central processing unit (CPU) "a" via a bus line g. The tape reader f reads data input from a tape h, and the axis controller r outputs a predetermined command signal to a servo circuit i to control a servomotor j.

Various control programs to be executed by the CPU are stored in the memory (ROM) b. The memory (RAM) c stores command data input from the teaching panel d and tape reader f, as well as the results of processing executed by the CPU a and other data.

Figure 4A:
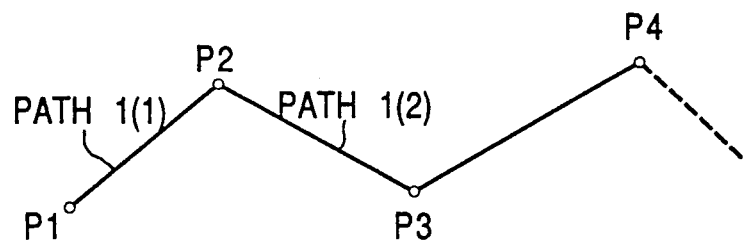
Figure 4B:
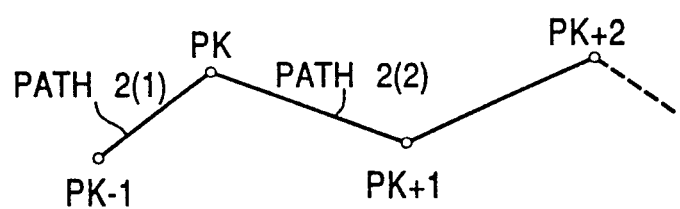
Figure 5A:
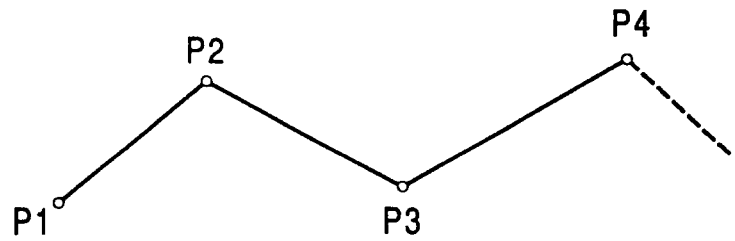
FIGS. 5(a), and (b) are explanatory diagrams illustrating storage of position data in the prior art.
Figure 5B:
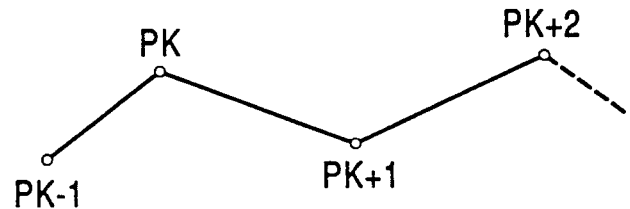

The present invention is characterized in that there is provided means for gathering together a position data group $P_1$, $P_2$, $P_3$, $P_4$, ... and converting it into set-type command data "PATH 1", setting various data between position data $P_1$, $P_2$ as "PATH 1(1) and various data between position data $P_2$, $P_3$ as "PATH 1(2), ..., as shown in FIG. 4(a), and gathering together a position data group $P_{K-1}$, $P_K$, $P_{K+1}$, $P_{K+2}$, ... and converting it into set-type command data "PATH 2", setting various data between position data $P_{K-1}$, $P_K$ as "PATH 2(1), setting various data between position data $P_K$, $P_{K+1}$ as "PATH 2(2), ..., as shown in FIG. 4(b), and thereafter editing these set-type command data (hereinafter referred to as "set data") to create a robot motion program.

FIGS. 2(a)-(c) and FIGS. 3(a)-(c) are views for describing examples of the present invention.

Figure 2:
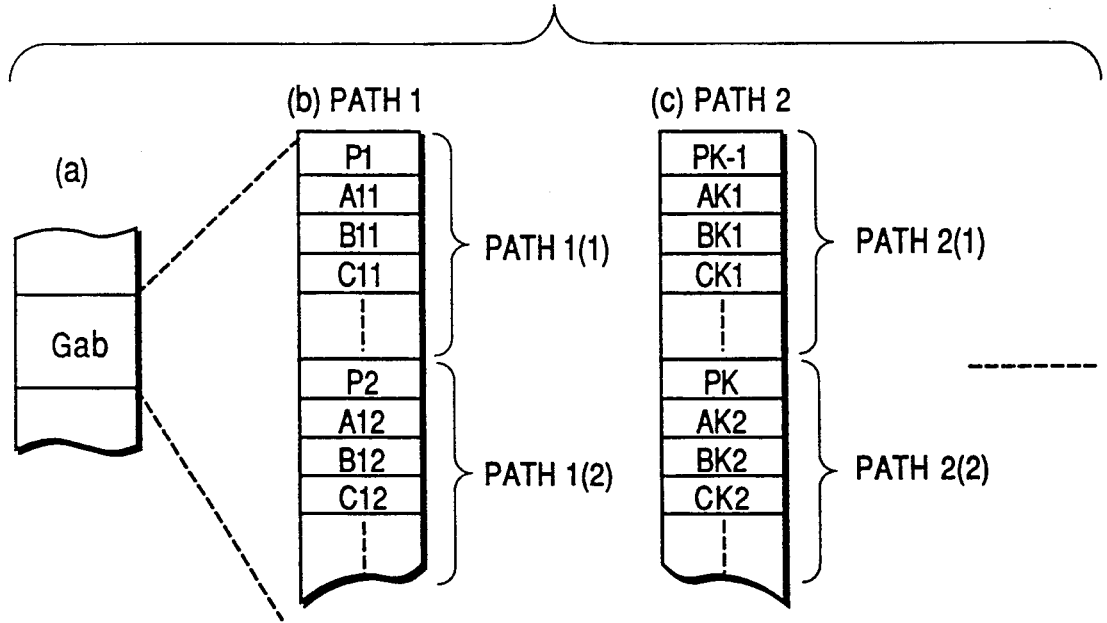
FIGS. 2(a), (b), and (c), FIGS. 3(a), (b), and (c), and FIGS. 4(a), and (b), are illustrations describing examples of the present invention.

FIG. 2(a) illustrates a main program. When a code Gab (where a, b each represent one integer from 0 to 9) is read out, the robot motion program edited into PATH 1 in FIG. 2(b), PATH 2 in FIG. 2(c), ... is executed. This motion program is edited by the CPU a and stored in a specific area of the RAM c.

Figure 3:
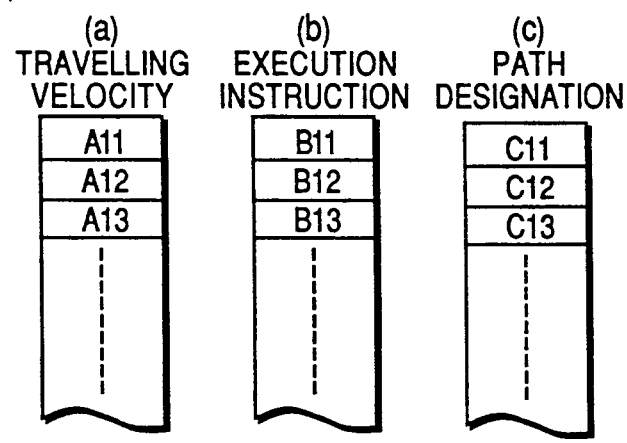

Next, the formation of the set data converted into "PATH 1" corresponding to FIG. 4(a) will be described in accordance with FIG. 2(b) and FIGS. 3(a), (b) and (c).

The "PATH 1" is composed of "PATH 1(1)" between position data $P_1$, $P_2$, "PATH 1(2)" between position data $P_2$, $P_3$, ..., as described above. Of these, the "PATH 1(1)" is data composed of the position data $P_1$, the travelling velocity $A_{11}$ between $P_1$ and $P_2$, an instruction $B_{11}$ to be executed at position $P_1$, such as an instruction for a specific motion of the robot hand, a path designation $C_{11}$ for the path between $P_1$ and $P_2$, and an indication as to whether or not positioning at particular positions is to be neglected, etc. The indication regarding the neglecting of positioning is a command which simply causes the robot to pass by the vicinity of a position without a robot motion based on positioning being performed at the position.

Similarly, the data of "PATH 1(2)" corresponding to the interval between the position data $P_2$, and $P_3$ of FIG. 4(a) is composed of position data $P_2$, travelling velocity $A_{12}$ an execution instruction $B_{12}$, a path designation $C_{12}$, ..., and other information taught to the robot.

The set data "PATH 2" of FIG. 2(c) corresponding to FIG. 4(b) is composed of "PATH 2(1)", "PATH 2(2)", ..., each of which is constituted by position data $P_{K-1}$, travelling velocity $A_{K1}$, execution instruction $B_{K1}$, path designation $C_{K1}$, ..., etc.

More specifically, in the present invention, various data at each of the commanded positions are converted into set data "PATH 1", which is composed of "PATH 1(1)", "PATH 2(1)", ..., etc., the set data are stored in the RAM c, and the set data "PATH 2" ..., etc. are similarly stored in the RAM c. From RAM c the set data is suitably edited to form a robot motion program.

Though an embodiment of the present invention has been described, the invention is not limited thereto and can be modified in a variety of ways without departing from the scope of the claims.

The robot control apparatus of the invention improves upon the conventional method of storing taught points. Even if there are many taught points for robot motion, conversion is made into set-type data which simultaneously incorporates various information such as travelling velocity at these positions besides the position data, and the data are stored. This makes the robot command data easy to manage.

We claim:

1. A robot control apparatus for programmably controlling a taught/playback-type robot, comprising:
    teaching panel means for teaching robot command data including motion target position and motion velocity;
    data converting means for converting a position data group contained within the robot command data from said teaching panel into set-type command data in which the robot command data corresponding to position data in the position data group are grouped together as a set, said data converting means effects the conversion into the set-type command data from the motion target position, the motion velocity, and the other robot command data taught to the robot;
    data memory means for storing the set-type command data; and
    processing control means for creating robot motion data by editing the set-type command data stored in said data memory means.

2. A robot control apparatus according to claim 1, wherein the other robot command data includes an execution instruction and a path designation.

3. A method for story taught points of a predetermined motion path for a robot, comprising the steps of:
    (a) receiving taught data corresponding to the taught points of the predetermined motion path, the taught data includes position data, a travelling velocity, an execution instruction, and a path designation;
    (b) converting the taught data into set-type command data in which the taught data relevant to robot motion between adjacent taught points is grouped as a set, said converting comprising the substeps of:
        (b1) grouping the taught data into set groups corresponding to the robot motion between adjacent taught points of the predetermined motion path; and
        (b2) arranging the taught data within each of the set groups in a predetermined order to form the set-type command data; and
    (c) editing the set-type command data to supply a robot motion program.

4. A robot control apparatus for controlling a robot, comprising:
    storage means for storing taught data corresponding to taught data points of a predetermined motion path for the robot;
    conversion means for converting the taught data points into set-type command data in which the taught data corresponding to robot motion between adjacent taught points is grouped as a set, where, said conversion means includes
        means for grouping the taught data into set groups corresponding to robot motion between adjacent taught points of the predetermined motion path; and
        means for arranging the taught data within each of the set groups in a predetermined order to form the set-type command data; and
    edit means for editing the set-type command data to produce a robot motion program.

* * * * *